(No Model.)
L. C. CHASE.
HAY FORK.
No. 257,150. Patented May 2, 1882.
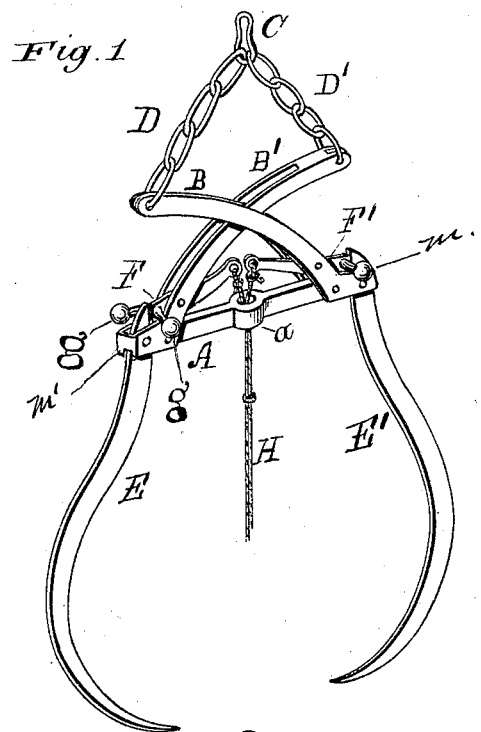
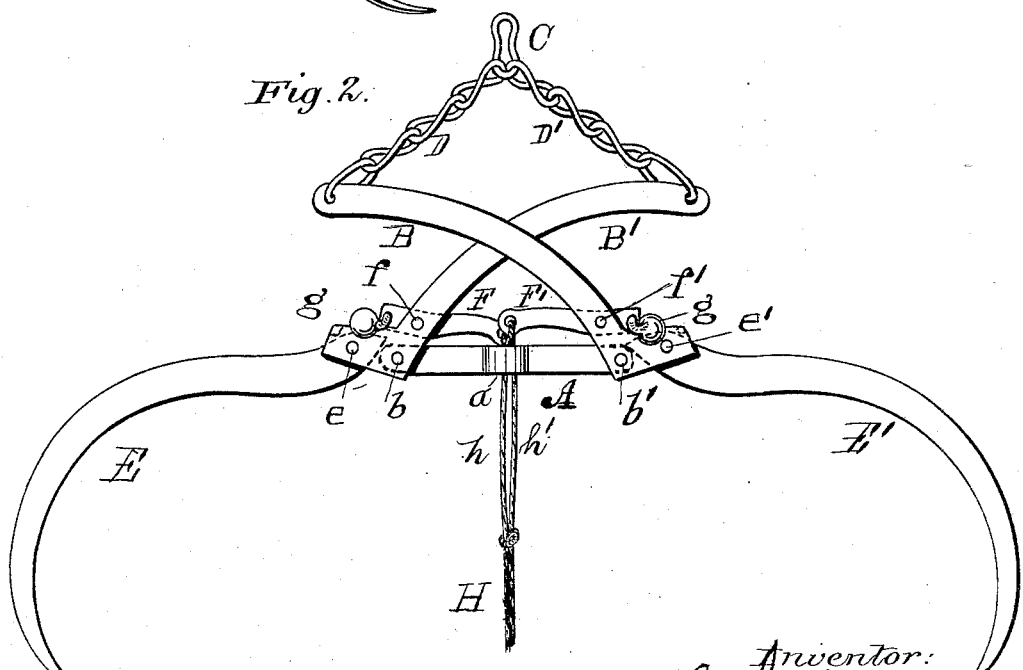
Witnesses:
Inventor: Lewis C. Chase

UNITED STATES PATENT OFFICE.

LEWIS C. CHASE, OF WAUPUN, WISCONSIN.

HAY-FORK.

SPECIFICATION forming part of Letters Patent No. 257,150, dated May 2, 1882.

Application filed January 27, 1882. (No model.)

*To all whom it may concern:*

Be it known that I, LEWIS C. CHASE, a citizen of the United States of America, residing at Waupun, in the county of Fond du Lac and State of Wisconsin, have invented certain new and useful Improvements in Hay-Forks; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 is a perspective of my fork in closed or operative position, and Fig. 2 is a side elevation of the same opened.

Like letters refer to like parts in both figures.

A represents a rigid cross-bar, having an opening or aperture, $a$, therethrough.

B B' are two curved slotted levers, crossing each other, pivotally attached at $b$ $b'$ to the cross-bar, and at their upper ends connected to a link, C, by chains D D'. Each of the levers B B' is extended outwardly to form a support for the tines of the fork. The tine E is pivotally secured in the slotted lever B' at $e$, and the tine E' is in like manner secured in the slotted lever B at $e'$, and each tine is substantially semicircular or semi-elliptical in shape, and is arranged with its lower free pointed end presented inwardly.

In the slotted lever B, and above the cross-bar A, is pivotally secured, at $f'$, a dog or catch-lever, F', the outer end of which is weighted at $g$, in order that when not otherwise influenced it shall act against the upper end of tine E' and hold it in a closed position, as shown in Fig. 1, and at its inner end said dog is apertured for the attachment of the branch $h'$ of the tripping-rope H, the branch $h$ of which is connected to a similar dog, F, arranged at $f$ in like manner in the slotted lever B'.

If desired, the dogs may be pivoted outside of the tines and operated by ropes attached to their outwardly-projecting ends.

The operation of the fork, as constructed, is as follows: The user opens the fork to the position shown in Fig. 2, and presses it into the hay as deep as the cross-bar will permit. Power is then applied by means of the usual hoisting-rope, which is attached to link C, and the upper ends of levers B B' are drawn toward each other, and as the dogs are not interposed, each tine, being pressed by the lower closed point, $m$ $m'$, of the levers B B', respectively, constitutes, with its lever, a continuous lever, pivoted at $b$ and $b'$, respectively, whereby their lower pointed or free ends are also brought together, thus gathering the load of hay they are to carry. This movement forces the tines inwardly until the weighted ends of the dogs drop between the upper ends of the tines and the slotted bars and retain the tines in their closed position.

To unload the fork, power is applied to the tripping-rope H, which depresses the inner and elevates the outer ends of the dogs, and the weight of the confined hay spreads the tines and it falls from the fork.

Having described my invention and its operation, what I claim as new, and desire to secure by Letters Patent, is—

1. In a hay-fork, the combination of two slotted levers pivotally attached to a rigid cross-bar with two inwardly-curved tines having heads or ends projecting upwardly above the said cross-bar, pivoted in said levers within their closed ends, and means for drawing the upper ends of said levers toward each other, substantially as shown and described.

2. The combination of two slotted levers pivotally attached to a rigid cross-bar, and two inwardly-curved tines having heads or ends projecting upwardly above the said cross-bar, pivoted in said levers within their closed ends, with pivoted dogs adapted to be interposed between the upper ends of said tines and levers, substantially as shown and described.

3. The combination of the slotted levers B B', pivotally attached to the rigid cross-bar A, with the tines E E', pivotally attached to the levers, and means, substantially as shown and described, for drawing the upper ends of the levers together and for locking the tines against outward movement at their lower ends, substantially as shown and described.

4. The combination of link C, chains D D', levers B B', dogs F F', cross-bar A, perforated at $a$, rope H $h$ $h'$, and tines E E', pivotally attached to the levers, substantially as shown and described.

In testimony whereof I have affixed my signature in presence of two witnesses.

LEWIS C. CHASE.

Witnesses:
E. B. STOCKING,
CHAS. T. LOWELL.